United States Patent [19]
Marik et al.

[11] Patent Number: 4,903,329
[45] Date of Patent: Feb. 20, 1990

[54] CLAMPING CIRCUIT FOR A PLL TUNING SYSTEM

[75] Inventors: Charles J. Marik, Richmond; Lawrence Ecklund, Wheaton, both of Ill.

[73] Assignee: Motorola, Inc., Schaumburg, Ill.

[21] Appl. No.: 61,757

[22] Filed: Jun. 15, 1987

[51] Int. Cl.$^4$ .............................................. H04B 11/16

[52] U.S. Cl. .................................... 455/182; 455/260; 455/264; 381/15

[58] Field of Search ............... 455/260, 265, 316, 317, 455/257-259, 139, 164, 182, 264, 234, 183; 331/4, 11, 14; 381/4, 13, 15

[56] References Cited

U.S. PATENT DOCUMENTS

| | | | |
|---|---|---|---|
| 4,394,778 | 7/1983 | Ikeguchi et al. | 455/182 |
| 4,406,017 | 9/1983 | Takahashi | 455/139 |
| 4,476,586 | 10/1984 | Tanaka et al. | 455/164 |
| 4,498,191 | 2/1985 | Rogers | 455/164 |
| 4,523,127 | 6/1985 | Sato | 455/260 |
| 4,568,888 | 2/1986 | Kimura et al. | 455/260 |
| 4,680,778 | 7/1987 | Krinock | 455/260 |
| 4,696,056 | 9/1987 | Morita | 455/265 |

OTHER PUBLICATIONS

"An Effective Method for Correcting the Loop Filter DC Drift of a PLL in the Out-of-Lock State Using a Phase Frequency Detector", IEEE 1986.

*Primary Examiner*—Benedict V. Safourek
*Assistant Examiner*—Curtis Kuntz
*Attorney, Agent, or Firm*—Wayne J. Egan

[57] ABSTRACT

An AM Stereo receiver is described which includes an AGC having an output which indicates whether the received signal has significantly decreased in level and having a clamping circuit for controlling the voltage at the input of a VCO. The clamping circuit is further defined as having a window detector for sensing a change in the voltage at the input of the VCO according to a predetermined threshold; a selectable controller, responsive to the window detector, for adjusting the voltage at the input of the VCO; and a window reduction circuit, responsive to the output signal of the AGC, for altering the predetermined threshold to provide the controller with a more sensitive indication of a drift in the voltage at the input of the VCO. The receiver additionally includes a conventional locked loop driver for steering the VCO according to the phase of the received input signal. When the AGC output signal indicates that the signal quality of the received signal has significantly decreased in level, or when the window detector indicates that the system is tuned outside of an established narrow "tuned" window, the locked loop driver is disabled to prevent the locked loop driver from introducing a beat note into the VCO.

5 Claims, 4 Drawing Sheets

CLAMPING CIRCUIT FOR A PLL TUNING SYSTEM

FIELD OF THE INVENTION

The present invention relates generally to electronic tuning circuits and, more particularly, to electronic tuning circuits employing clamping control for a voltage controlled oscillator in a phase locked loop.

DESCRIPTION OF THE PRIOR ART

Employing a phase locked loop (PLL) in a receiver to control a voltage controlled local oscillator (VCLO) in a tuning system involves comparing the phase of the received signal to that of the VCLO. When the frequency of the VCLO is the same as the received input signal, the PLL is said to be "locked". However, when the input signal effectively disappears, the PLL becomes unlocked since there is no longer an input signal against which the VCLO may be controlled. This presents a problem when the input signal returns to nominal level.

The problem is that when the system unlocked, the voltage device (usually a capacitor) controlling the input to the local oscillator begins to drift. If left uncontrolled, this drift will fluctuate anywhere between the upper and lower rails of the power supply. When the input signal returns to a nominal receptive level, the PLL must slowly return to its locked stated. This introduces an unwarranted phase locking delay (or no lock at all) before the receiver may fully utilize the information carried on the received input signal.

One attempt to overcome this delay involves the employment of a pair of diodes on either side of the voltage device to hold the VCLO at a fixed voltage level. When the voltage device begins to drift beyond the voltage drop of one of the diodes, the voltage is clamped to maintain the VCLO within a "window". Unfortunately, this type of control does not facilitate temperature compensation (the $V_{be}$ varies with temperature at approximately $-2.2$ mV/° C.). Consequently, it fails to maintain the original voltage level over temperature.

In another attempt to overcome the delay, two PLL circuits are employed to control the tuning system. The first PLL circuit is used to control the overall range of the PLL, while the second PLL circuit is used to control the PLL once it is within the phase locking range of the second PLL. Unfortunately, cost of employing two PLL circuits to accomplish the tuning function for one receiver is unwarrantly burdensome.

Accordingly, a clamping technique for a tuning system is needed which overcomes these deficiencies.

SUMMARY OF THE INVENTION

It is an object of the present invention to provide a clamping circuit for a tuning system which overcomes the above mentioned shortcomings.

It is a more particular object of the present invention to provide a clamping circuit for a tuning system which provides a substantially fixed VCLO tuning range in the absence of the received input signal.

It is a further object of the present invention to provide a clamping circuit for a tuning system which provides a substantially fixed VCLO tuning range in the absence of the received input signal and which is substantially indifferent to ambient temperature variations.

The present invention can briefly be described in terms of a preferred embodiment involving an AM stereo receiver which includes an AGC having an output which indicates whether or not the amplitude of a received signal has significantly decreased and having a clamping circuit for controlling the voltage at the input of a voltage controlled oscillator. The clamping circuit is further defined as having a window detector sensor for sensing a drift in the voltage at the input of the voltage controlled oscillator according to a predetermined threshold; a selectable controller, responsive to the window detector, for adjusting the voltage at the input of the voltage controlled oscillator; and a window reduction circuit, responsive to the output signal of the AGC and the window detector, for altering the predetermined threshold to provide the controller with a more sensitive indication of a drift in the voltage at the input of the voltage controlled oscillator.

The receiver additionally includes a conventional locked loop driver for steering the voltage controlled oscillator according to the "phase" (relating to the L-R component as is referred to in more detail in copending application Ser. No. 038563, entitled "Automatic IF Tangent Lock Control Circuit", filed on Apr. 15, 1987, incorporated herein by reference, and assigned to the assignee of the present application of the received input signal. When the AGC output signal indicates that the amplitude of the received signal has significantly decreased, the locked loop driver is disabled to prevent the locked loop driver from introducing a beat note into the voltage controlled oscillator which may be introduced as a function of locking the loop through the IF section, as described in "Automatic IF Tangent Lock Control Circuit", supra. The locked loop driver is also disabled when the window sensor indicates that the signal is outside of an inner established window in order to prevent the locked loop driver from generating beat notes onto the received signal while the system is not tuned.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in which like reference numerals identify like elements, and wherein:

FIGS. *2a* and *2b* comprise a detailed diagram of block 10 of FIG. 1.

DETAILED DESCRIPTION OF THE PREFERRED EMBODIMENT

The tuning system disclosed in this specification has particular use for stereo receivers. More specifically, this system has applicability to AM stereo receivers for systems transmitting a signal to be received represented by the following formula:

$$(1+L+R)\cos(w_c t+\phi)$$

where L and R are information signals, $w_c$ represents the carrier frequency and $\phi$ is the angle which is equal to $\tan^{-1}[(L-R)/(1+L+R)]$. This signal and the system employing it are described in U.S. Pat. No. 4,218,586., assigned to the same assignee, and incorporated herein by reference.

Figure 1:
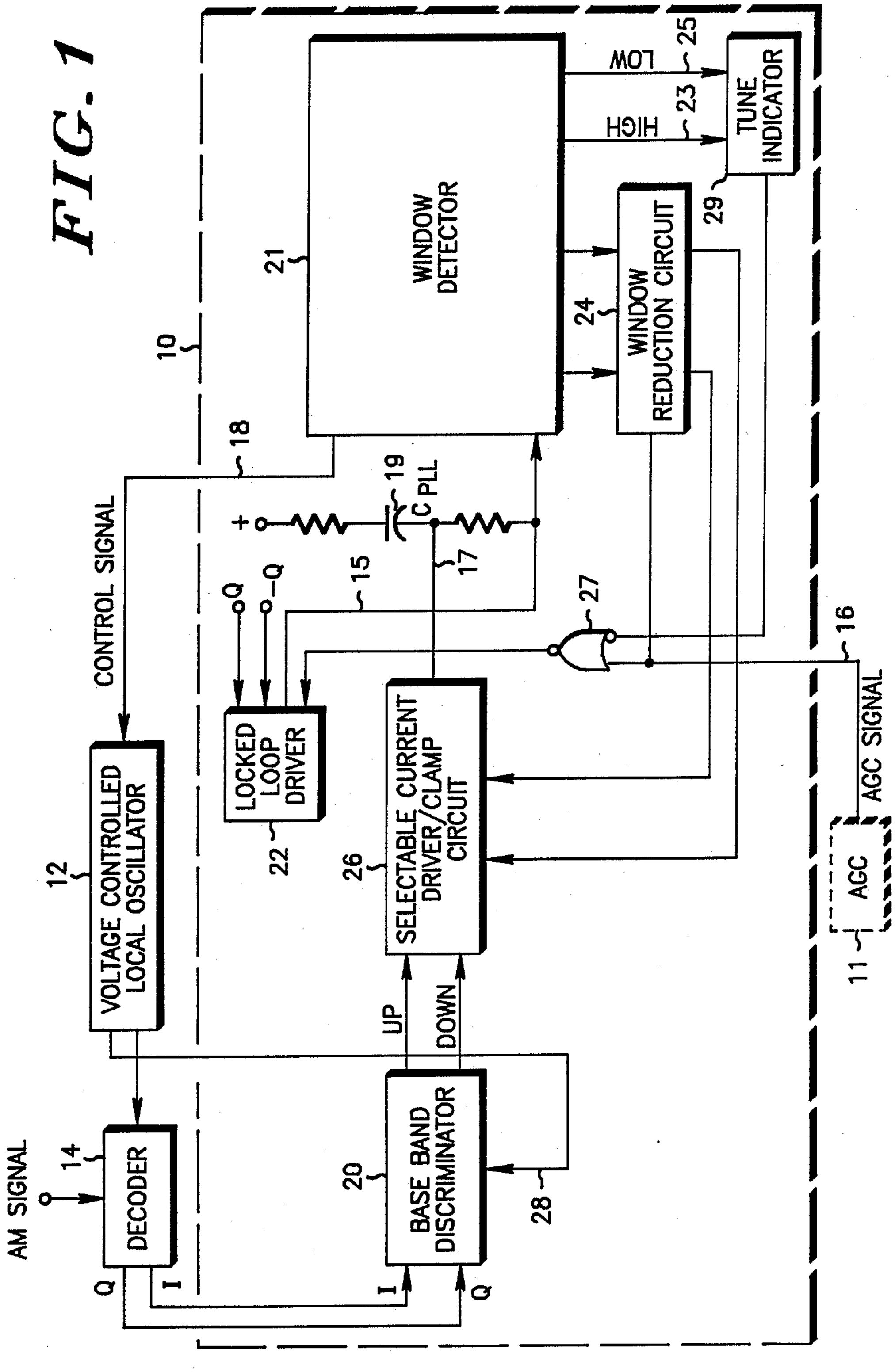
FIG. 1 is a diagram of a tuning system according to the present invention.

FIG. 1 illustrates such a tuning system. The system includes a tuning circuit 10, a voltage controlled local oscillator (VCLO) 12 and a decoder 14. The decoder 14 receives the above described AM signal along with the signal provided by the VCLO 12 to generate the I and Q signals as described in "Automatic IF Tangent Lock Control Circuit", supra. The tuning circuit 10 receives these I and Q signals, in conjunction with an AGC signal 16 provided by an AGC circuit 11, to rapidly tune the system, and to maintain the tuning of the system to the nearest station. Such tuning control includes providing a voltage control signal 18, via a PLL capacitor 19, to adjust the local oscillator 12.

The AGC signal 16 indicates when the AGC circuit is set at maximum gain (indicating the presence of a weak received AM signal or no signal at all). Such a signal may be implemented by modifying a conventional AGC threshold detection circuit (typically used in electronic tuners for stop-on-station features) such that the detection occurs when the AGC reaches maximum gain, rather than at some intermediate level.

The tuning circuit 10 controls the voltage of the PLL capacitor 19 using two current pumping circuits: a locked loop driver 22 and a selectable current driver/-clamp circuit 26. The locked loop driver 22 charges and discharges the PLL capacitor 19 when the PLL is locked using a first driver lead 15, while the driver/-clamp circuit 26 charges and discharges the PLL capacitor 19 using a second driver lead 17 when the PLL is not locked.

The charging and discharging of the PLL capacitor 19 is accomplished in three different modes. The first mode occurs when the AGC circuit is set at maximum gain. The second mode occurs when the AGC circuit is not set at maximum gain, and the tuning circuit is not phase locked to the AM signal (meaning that the received signal is near but not exactly on the frequency of an AM station). The last mode occurs when the AGC circuit is not set at maximum gain, and the tuning circuit is phase locked (where "phase" is used as previously described) to the AM signal.

When the condition coincident with the first mode is present, the AGC signal 16 is employed to disable the locked loop driver 22 and to enable a window reduction circuit 24. The locked loop driver 22 is disabled to prevent any beat notes, generated by the phase difference between its Q and −Q inputs, from being fed back into the VCLO 12. The basic operation of the locked loop driver 22, less the disabling feature discussed above, is typical of a conventional L-R phase driver (see for example Motorola's MC13020 IC), employed to control the PLL capacitor 19 while the tuning circuit is phase locked to the received signal. When the window reduction circuit 24 is enabled, it is used in conjunction with the window detector 21 to activate the driver/-clamp circuit 26 which, as previously discussed, controls the second driver lead 17 to the PLL capacitor 19.

Such activation of the driver/clamp circuit 26 occurs in response to changes in the PLL capacitor 19 as sensed by the window detector 21. The window detector 21 monitors the voltage of the PLL capacitor 19, with respect to a reference voltage, and produces signals which activate the driver/clamp circuit 26 according to a predetermined degree of change to the PLL capacitor 19 voltage. When the clamping circuit is enabled (when the AGC circuit is set at maximum gain), the predetermined degree of change established within the window detector 21 is decreased such that the driver/clamp circuit 26 is activated to control the PLL capacitor voltage within a much narrower constraint, i.e., control is provided to the VCLO 12 to maintain its center frequency within a much narrower "window".

Accordingly, when the window reduction circuit 24 is enabled, the driver/clamp circuit 26 is activated to control the voltage at the PLL capacitor 19 such that the VCLO frequency remains substantially fixed until the AGC signal 16 indicates that the level of the input signal is acceptable, at which time the clamping circuit is disabled to allow the tuning circuit 10 to phase lock to the input signal without undue delay.

The window detector additionally provides signals to indicate when the phase tuning is fine tuned within the narrow window. In FIG. 1, these signals are shown as tune window high (HIGH) 23 and tune window low (LOW) 25, both as inputs to a tune indicator 29. When both signals are at a high logic state, the tune indicator 29 is activated to notify the operator that the tuning system is "fine tuned" to the received signal. The tune window signals 23 and 25 and the tune indicator 29 are discussed in more detail with FIGS. 2 and 3.

When the condition coincident with the second mode is present, i.e., when the received signal is at least close to an AM station and the tuning circuit is not phase locked, a baseband discriminator 20 provides control to the driver/clamp circuit 26 such that the current driver/clamp controls the voltage at the PLL capacitor 19 within a wide "window" corresponding to a frequency range centered about the selected operator frequency. This control under the wide window allows the tuning circuit to track the received signal until the tuning circuit phase locks. The locked loop driver 22 is disabled in this mode by the window detector 21 to prevent beat notes from being introduced to the received signal via the locked loop driver.

When the condition coincident with the third mode is present, i.e., when the tuning circuit is phase locked, the VCLO 12 generates a VCLO lock signal 28, indicating that the VCLO 12 is phase locked, which disables the base band discriminator 20, relinguishing control of the PLL capacitor 19 to the locked loop driver 22.

The following example may help illustrate the overall operation of the tuning system. Presume that power has just been applied to the tuning system and that no signal is detected (no station present). The AGC signal 16 will be in a low state to disable the locked loop driver 22 and enable the window reduction circuit 24. Since the window reduction circuit 24 is active, control over the PLL capacitor 19 will be constrained by the driver/-clamp circuit 26 in the narrower window. When a signal with sufficient power is detected and before the VCLO 12 becomes phase locked, the narrower window constraint is removed and the baseband discriminator 20 controls the voltage of the PLL capacitor 19 through the selectable current driver/clamp 26 in a fast lock steering mode. Once the VCLO 12 indicates phase lock, the baseband discriminator 20 is disabled and the locked loop driver 22 controls the voltage at the PLL capacitor 19. At this point, any drift occuring at the PLL capacitor 19 is monitored by the window detector 21. Slight variations in such drift are permitted within the "wider" window, unless the AGC signal indicates maximum gain, at which time the clamping circuit is activated to control the voltage at the PLL capacitor 19 within the narrower window as previously discussed.

Figure 2A:
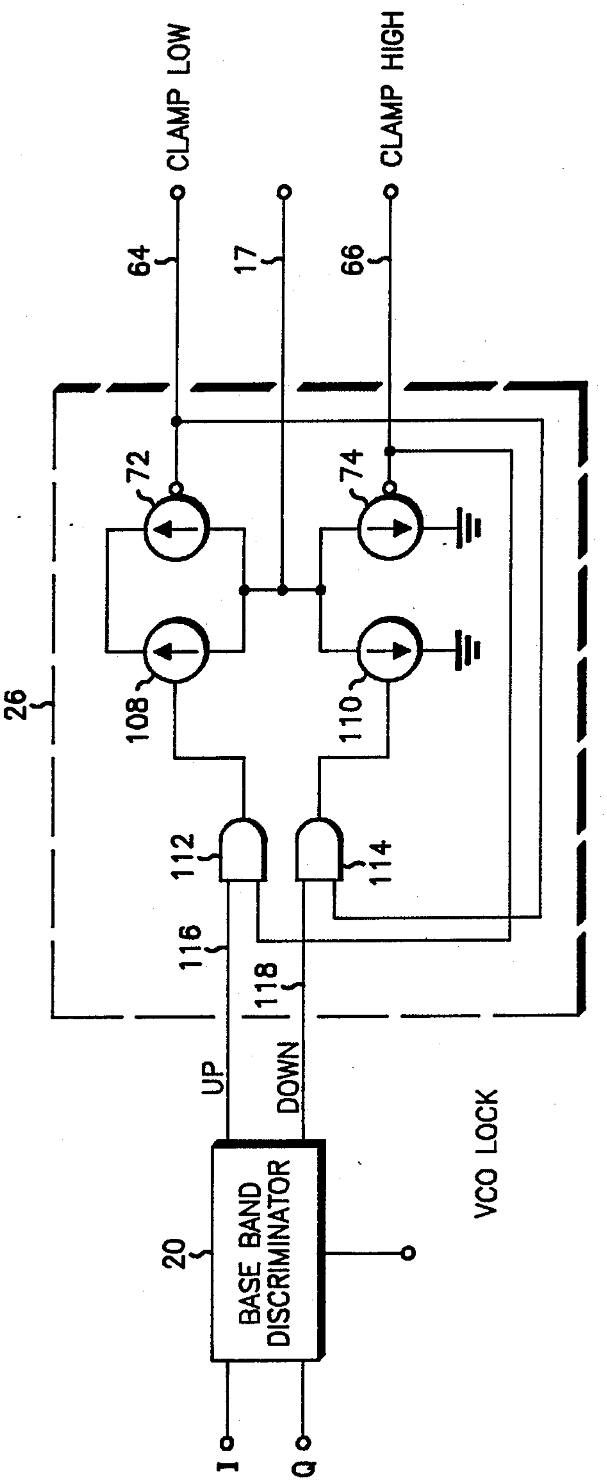
Figure 2B:
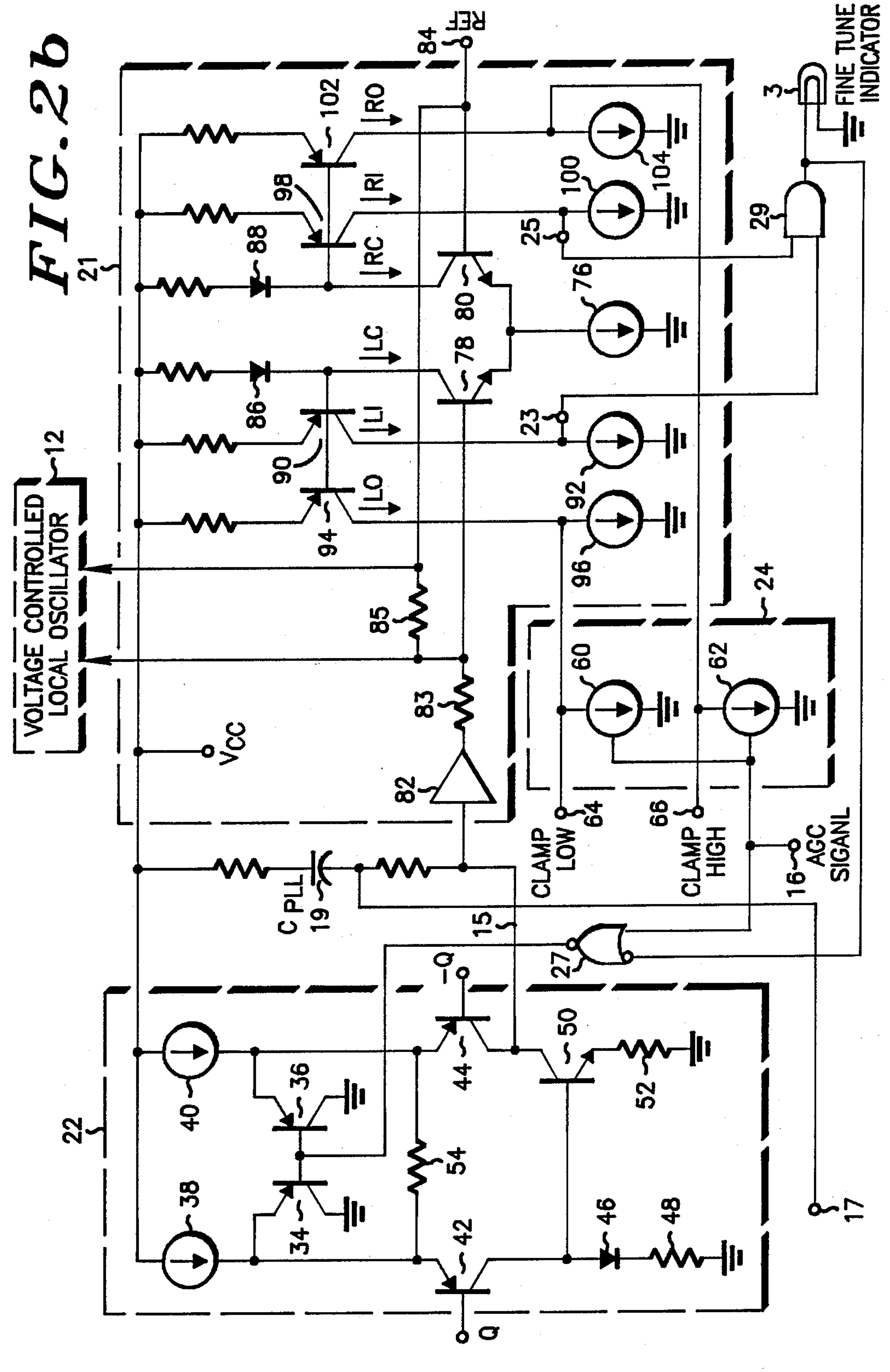

Referring now to FIGS. 2*a* and 2*b*, a more detailed diagram of the tuning circuit 10 of FIG. 1 is shown. In FIG. 2*b*, the locked loop driver 22 is shown including a pair of PNP transistors 34 and 36 having their respective emitters connected to a pair of current sources 38 and 40 and the respective emitters of a second pair of transistors 42 and 44. The base of transistor 42 is controlled by the Q signal from the decoder 14, or its equivalent, while the base of transistor 44 is controlled by the same Q signal shifted in phase 180 degrees. The collector of transistor 42 is connected in series to a diode 46, a resistor 48 and then to ground, while the collector of transistor 44 is coupled to ground through the collector-emitter junction of a transistor 50 and a resistor 52. The base of transistor 50 is connected to the collector of transistor 42, and a resistor 54 is connected between the emitters of transistors 42 and 44 to provide the proper current gain of locked loop driver 22.

When the AGC signal 16 indicates that the AGC is operating at maximum gain, or when the window detector 21 indicates that the tune lamp is not on (meaning that the signal is outside the inner established window), the locked loop driver 22 is disabled as a result of a NOR gate 27 forcing the transistors 34 and 36 "on" and sinking all the current provided by current sources 38 and 40. This causes the collector of transistors 50 and 44 to "float" such that the first driver lead 15 does not sink or source current to the PLL capacitor 19.

When the output of the NOR gate 27 is high, transistors 34 and 36 are shut off and the locked loop driver is allowed to control the voltage of the PLL capacitor 19 using the first driver lead 15. When the received input signal is in phase with the VCLO, the locked loop driver is essentially balanced (the current through transistor 44 is equal to the current in transistor 50), and, thus, no current is provided at the output of the looped driver 22. When the received input signal is not in "phase" with the VCLO, the first driver lead 15 is used to slowly control the PLL capacitor voltage so as to maintain phase lock between the VCLO and the received input signal.

The window detector 21 in FIG. 2*b* includes a transistor network having left and right halves which are used to determine the degree of change at the PLL capacitor 19. The left and right halves are mirror images (current mirrors) of each other centered about a center current driver 76 which constantly sinks 10 microamperes (ua) of current provided by transistors 78 and 80. When the window detector is balanced, the left and right halves are both carrying 5 ua of current. A buffer 82, coupled to monitor the PLL capacitor 19, is used to drive each half of the window detector 21 in differential form via a first transistor 78 and a second transistor 80. When the voltage at the PLL capacitor 19 changes, the transistor 78 responds with more or less drive voltage at its base-emitter junction with respect to the fixed reference voltage at the base of the transistor 80. In order to maintain an accurate differential operation between the two halves, the output of the buffer 82 is coupled to the transistor 78 through a resistor 83, and the base of transistor 78 is coupled to the base of transistor 80 through a resistor 85.

The PLL capacitor 19 is coupled to the VCLO 12 at the base of transistor 78 to provide the VCLO with the steering control voltage. The VCLO 12 also receives a reference voltage at terminal 84, which reference voltage the VCLO uses to properly interpret the steering control voltage.

Accordingly, as the collector current in one transistor (78 or 80) increases, the collector current in the other transistor decreases. Since the current driver 76 constantly sinks 10 ua, as the PLL capacitor voltage changes, one side of the window detector will increase the amount of current flowing therethrough, and the other side will decrease by the same amount the first side increased such that the total current provided by transistors 78 and 80 adds up to 10 ua. This increase/decrease balance effect provides means for measuring and, in response controlling, the voltage drift at the PLL capacitor 19.

The balance effect is provided by three pairs of current paths in the window detector 21: left and right center current paths (LC and RC) sourcing the current driver 76, discussed above; left and right outer current paths (LO and RO); and left and a right inner current paths (LI and RI). The left inner and outer current paths are current mirrors of the left center current path, and the right inner and outer current paths are current mirrors of the right center current path.

The left and right center current paths are used in conjunction with the transistors 78 and 80, as described above, to establish a differential operation within the window detector 21. Diode 86 is connected to transistor 78 and the respective base of both transistors 90 and 94 (in the LI and LO current paths respectively) to cause a substantially equivalent amount of current to flow through each of the current paths on the left side of the window detector 21. Similarly, diode 88 is connected to transistor 80 and the respective base of both transistors 98 and 102 (in the RI and RO current paths respectively) to cause a substantially equivalent amount of current to flow through the current paths on the right side of the window detector 21.

The left and right inner current paths are designed to detect a change in PLL capacitor 19 voltage from a nominal (while the system is frequency locked) 5 uA to 2.5 uA. If the change is not detected, the window detector is considered balanced and the tuning system indicates that it is fined tuned. If the change is detected, the fine tune indication is removed.

The left inner current path is established from the supply voltage through a resistor, a current turnaround transistor 90 and a current source 92. The right inner current path is established from the supply voltage through a resistor, a transistor 98 and a current driver 100. When the current flowing through one side of the window detector reaches or drops below 2.5 ua, the respective current source (92 or 100) is designed to trip, i.e., provide an effective path to ground, at which time one of the two tune window signals (23 or 25) so indicates by changing from a logic level high conditions to a low level. As previously discussed, the tune window signals 23 and 25 are received by the AND gate 29 which is used to indicate when the window detector is balanced. Thus, if neither of the current sources 92 and 100 have tripped, the tune window signals 23 and 25 remain in a logic high state to indicate that the tuning circuit is within the narrow tuning window, i.e., fine tuned.

The left and right outer current paths are designed to detect a greater change in PLL capacitor 19 voltage. If the change is detected, the window detector is considered unbalanced and the driver/clamp circuit 26 (FIG. 2*a*) is activated to control the PLL capacitor 19 voltage.

If the change is not detected, control over the PLL capacitor 19 voltage remains with either the locked loop driver 22 or the baseband discriminator 20.

The left outer current path is established from the supply voltage through a resistor, a transistor 94 and a current driver 96. The right outer current path is established from the supply voltage through a resistor, a transistor 102 and a current driver 104. When the current flowing through one side of the window detector reaches or drops below either 3.7 ua or 1.0 ua (the former when the window reduction circuit 24 is enabled), the respective current driver 96 or 104 trips, at which time one of two current drivers within the driver/clamp circuit 26 is enabled to control the PLL capacitor voltage. Thus, if the window reduction circuit 24 is enabled the PLL capacitor voltage is controlled in a substantially fixed manner (sensing current on one side of the window detector dropping from a balanced 5 ua to 3.7 ua), whereas in its absence much more variation is provided at the PLL capacitor (sensing current on one side of the window detector dropping from a balanced 5 ua all the way down to 1.0 ua).

Accordingly, by employing this differential structure, the window detector 21 is utilized to detect varying levels of changes in the voltage of the PLL capacitor 19, and, in response thereto, tight control is provided to the PLL capacitor voltage to overcome the inherent drift problem known in most tuning systems, and a highly accurate fine tune indication is provided to the operator.

As previously discussed, when the AGC signal 16 indicates that the AGC is at maximum gain (in the first mode of operation), the window reduction circuit 24 is enabled to increase the balance sensitivity of the window detector 21. The clamping circuit comprises two current sources 60 and 62. The current sources 60 and 62 together with the current sources 96 and 100, respectively, provide either a clamp low signal 64 or a clamp high signal 66 to control the driver/clamp circuit 26 (of FIG. 1). When the current sources 60 and 62 are enabled by the AGC signal 16, the current sinking capability of current source 60 or 62 (2.7 ua) is combined with the current sinking capability of current source 96 or 104 (1 ua) such that when the window detector 21 senses that the voltage at the PLL capacitor 99 is drifting beyond a predetermined amount (when the balance of the window detector drops below 3.7 ua), either the clamp low or the clamp high signal will be pulled down to ground, depending on the polarity required, to enable one of two current drivers 72 or 74 (FIG. *2a*) within the driver/clamp circuit 26 to maintain a substantially fixed voltage at the PLL capacitor 19.

In FIG. *2a*, the driver/clamp circuit 26 is shown to include four current drivers, 72 and 74 (previously discussed), and 108 and 110, the latter of which are controlled by 2-input AND gates 112 and 114, respectively. The base band discriminator 20 provides one input to each of the AND gates. An input 116 provided to the AND gate 112 is in a logic high state when the base band discriminator 20 indicates that the PLL should increase its frequency to tune the circuit 10, while an input 118 provided to the AND gate 114 is in a logic high state when the base band discriminator 20 indicates that the PLL should decrease its frequency to tune the circuit 10.

The second input to the AND gate 112 is controlled by the clamp high signal 66. When the clamp high signal is low, indicating that current driver 74 should be activated, AND gate 112 effectively disables current driver 108 from activating.

Similarly, the second input to the AND gate 114 is controlled by the clamp low signal 64. When the clamp low signal is low, indicating that current driver 72 should be activated, AND gate 114 effectively disables current driver 110 from activating.

The base band (frequency) discriminator 20 provides a fast-lock steering control for the PLL when the VCLO 12 is not locked (when the frequency of the received signal differs from the frequency the circuit 10 is tuned to), as indicated by the VCLO lock signal 28, to the received signals. As discussed above, the outputs of the discriminator 20 allow control over current drivers 108 and 110 such that the PLL capacitor is charged and discharged at 160 ua.

Accordingly, not more than two of the four current drivers in the selectable current driver/clamp circuit may be activated at any given time. One of the drivers 108 or 110 (sourcing/sinking) may be enabled by the discriminator 20 may be enabled, while one of the drivers 74 or 72 (sinking/sourcing) may be enabled. This allows varying rates of charge and discharge to the PLL capacitor 19 depending on the difference between the frequency of the received signal and the frequency to which the tuning circuit is tuned. Preferably, current drivers 108 and 110 charge/discharge at 160 ua, while current drivers 72 and 74 charge/discharge at 16 ua.

The base band discriminator 20 may be implented as is described in "Phase Locked Loop having Fast Frequency Lock Steering Circuit", filed on May 4th, 1987, patent application Ser. No. 045,500, assigned to the assignee of the present application and incorporated herein by reference.

Figure 3:
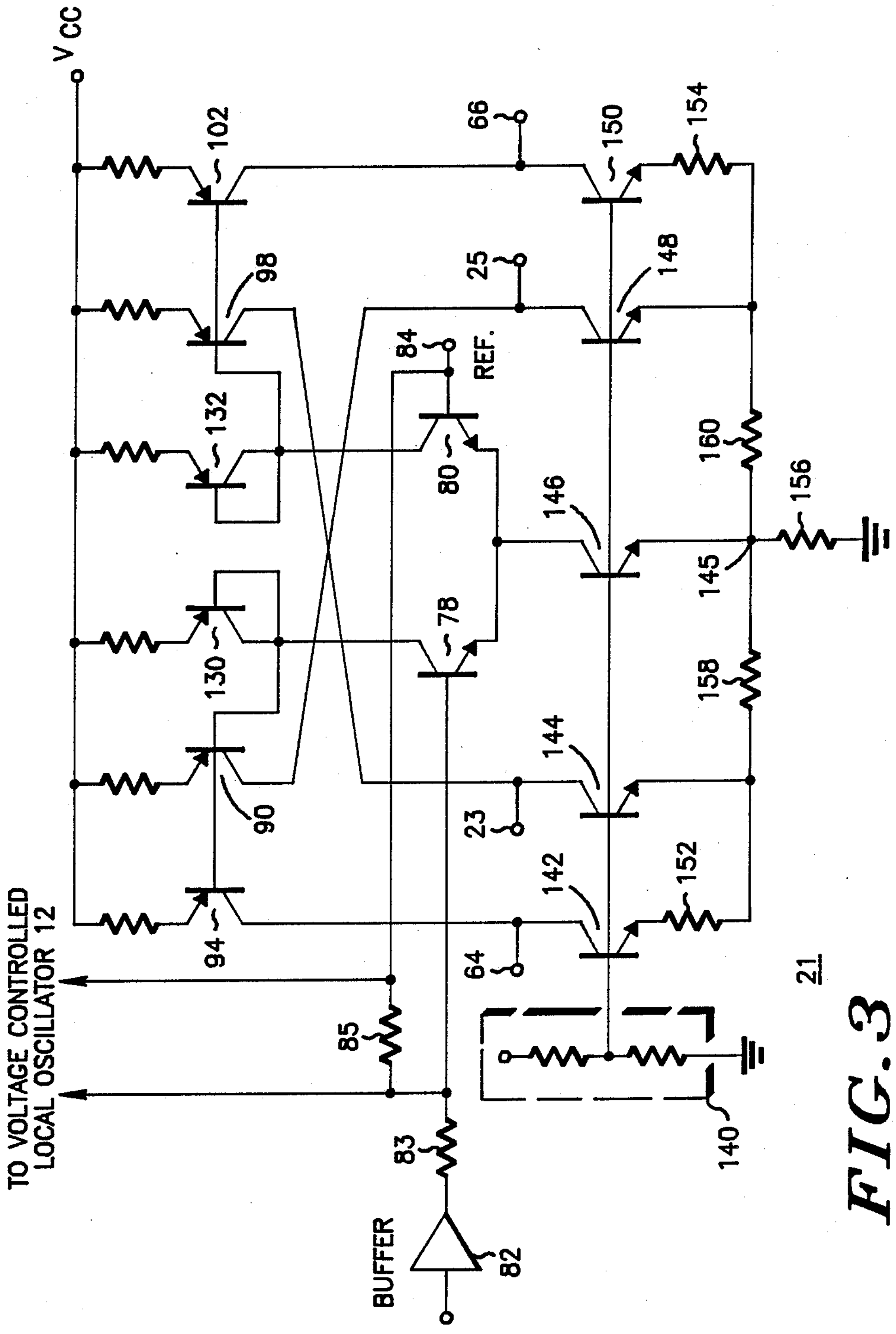
FIG. 3 is a detailed diagram of block 21 of FIG. *2b*.

In FIG. 3, a detailed illustration of the window detector 21 is shown. The details shown in FIG. 3 which are not shown in FIG. *2b* include transistor implementations of diodes 86 and 88 and current sources 60, 76, 92, 96, 100 and 104. The transistor implementation of diodes 86 and 88 includes two PNP transistors 130 and 132 having their respective emitters coupled to $V_{cc}$ through resistors. The base of each transistor 130 and 132 is connected to its respective collector. By adequately matching the characteristics of the transistors from each side, i.e. matching transistors 94, 90 and 130 and matching transistors 102, 98 and 132, the current passing through each of the current paths on the left side will be substantially identical as will each of the current paths on the right side of the window detector.

The transistor implementations of current sources 60, 76, 92, 96, 100 and 104 are shown, in part, as NPN transistors 142, 144, 146, 148 and 150 respectively. Additionally, a resistor network, described below, is provided to couple the emitters of each of these transistors to ground without requiring use of resistors having significantly large values, thus allowing for semiconductor implementation of the circuit 10.

Each transistor is driven at its base terminal by a circuit 140 providing a reference voltage. A resistor 156 provides a common terminal 145 at which a resistive path to ground is provided for each of the transistors 142 through 150. The emitters of transistors 144 and 148 are respectively connected to the terminal 145 through resistors 158 and 160. The emitters of transistors 142 and 150 are respectively connected to the emitters of transistors 144 and 148 through resistors 152 and 154. Additionally, the two inner current paths, as originating from transistors 90 and 98 "cross-over" such that at the bottom of the current path, the left inner current path is switched with the right current path.

This cross-over technique provides isolation to each of the current paths such that no two current paths on the same side can adversely effect the current detection established therefor. This may be best understood by analyzing the current paths without the cross-over technique employed.

For example, if the inner current paths were not crossed over, transistor 144 and 142 (located on the same side) would both trip once the current through the right outer current path dropped below 1 ua. However, before transistor 142 trips, the tripping of transistor 144 causes the voltage across resistor 158 to decrease, which alters the current detection level (the tripping threshold) for the left outer current path. On the other hand, by crossing over the inner current paths, the voltage reduction across the resistor 158 cannot effect the right outer current path since the left inner and outer current paths are never used at the same time.

Accordingly, the present invention provides a tuning system which incorporates a clamping circuit to maintain the VCLO at a substantially fixed voltage when the received input signal drops out in order to allow for fast phase locking when the signal returns. The clamping circuit is substantially temperature independent; thus, it requires no additional temperature compensation circuitry. Moreover, the present invention provides an overall phase locked loop tuning system which prevents beat notes from feeding back into the VCLO.

While the invention has been particularly shown and described with reference to a preferred embodiment, it will be understood by those skilled in the art that various other modifications and changes may be made to the present invention described above without departing from the spirit and scope thereof.

What is claimed is:

1. In a receiver receiving a received signal, a clamping circuit for controlling the voltage coupled to the input of a voltage controlled oscillator (VCO) comprising:

window detection means including;

first means for sensing a change responsive to the frequency of said received signal in the voltage coupled to the input of the VCO;

second means for establishing a plurality of thresholds with respect to the change in voltage; and third means, responsive to said second means, for indicating the sensed voltage has exceeded at least one of said thresholds; and clamping means, responsive to said window detection means, for selectively controlling the voltage coupled to the input of a VCO according to the thresholds established within the window detector means, wherein said window detection means includes a differential driver having an input coupled to the voltage at the input of the VCO and having a pair of current mirrors each respectively operating responsive to the differential driver, wherein said window detection means includes a resistor network, coupled to the pair of current mirrors, for setting the thresholds, wherein one of said current mirrors from one pair crosses over one of said current mirrors from the other pair.

2. In a receiver which includes sensor means for detecting a decrease in the level of a received signal, a clamping circuit for controlling the voltage coupled to the input of a VCO, comprising:

window detection means for sensing a change responsive to the frequency of said received signal in the voltage at the input of the VCO according to a predetermined threshold;

window reduction means, responsive to the sensor means, for altering the predetermined threshold; and clamping means, responsive to said window detection means, for selectively controlling the voltage coupled to the input of the VCO, wherein said window reduction means responds to said sensor means by lowering the predetermined threshold such that the clamping means responds to smaller changes in the voltage at the input of the VCO, wherein said window reduction means further responds to said sensor means by signalling the clamping means to initiate said selective control of the voltage at the input of the VCO.

3. In a receiver which includes sensor means for detecting a decrease in the level of a received signal, a clamping circuit for controlling the voltage coupled to the input of a VCO, comprising:

window detection means for sensing a change responsive to the frequency of said received signal in the voltage at the input of the VCO according to a predetermined threshold;

window reduction means, responsive to the sensor means, for altering the predetermined threshold; and clamping means, responsive to said window detection means, for selectively controlling the voltage coupled to the input of the VCO, further including phase driver means, responsive to the sensor means, for controlling the voltage at the input of the VCO when the phase locked loop is locked to the received signal.

4. In a tuning system of a receiver which includes sensor means for detecting a decrease in the level of a received signal, a clamping circuit for controlling the voltage at the input of a VCO, comprising:

a baseband discriminator for indicating the direction that is required to tune the receiver to the received signal;

window detection means for sensing a change responsive to the frequency of said received signal in the voltage at the input of the VCO according to a predetermined threshold; and clamping means, responsive to said window detection means and said baseband discriminator and the sensor means, for selectively controlling the voltage at the input of the VCO at at least two separate rates, wherein the clamping means includes first charge pump means, responsive to said baseband discriminator, for controlling the voltage at the input of the VCO at a first rate and also includes second current pump means, responsive to said window detection means, for controlling the voltage at the input of the VCO at a second rate, which is substantially less than said first rate.

5. In a AM stereo receiver which includes sensor means for detecting a decrease in the level of an AM received signal, and a lock signal for indicating when the receiver is locked to the received signal, a circuit for controlling the voltage at the input of a VCO, comprising:

a baseband discriminator, responsive to absense of the lock signal, for indicating the polar direction that is required to tune the receiver to the received signal;

phase driver means, responsive to the sensor means, for controlling the voltage at the input of the VCO when the receiver is locked to the received signal;

window detection means for sensing at least two degrees of voltage change at the input of the VCO according to one or more predetermined thresholds; and window reduction means, responsive to said sensor means and said window detection means, for altering one of said thresholds such that one of the degrees of sensed voltage change is lessened;

tune indicator means, responsive to said window detection means, for indicating when the receiver is tuned to the AM received signal;

clamping means, responsive to said window detection means, said baseband discriminator and the sensor means, for selectively controlling the voltage at the input of the VCO at a first rate selected by the baseband discriminator, and at a second rate selected by the window detection means.

* * * * *